Jan. 5, 1937. H. D. WEED 2,067,032
TIRE CHAIN TIGHTENER
Filed Aug. 28, 1936

INVENTOR
Harry D. Weed
BY
Wooster T. Davis
ATTORNEYS

Patented Jan. 5, 1937

2,067,032

UNITED STATES PATENT OFFICE 2,067,032

TIRE CHAIN TIGHTENER

Harry D. Weed, Southport, Conn.

Application August 28, 1936, Serial No. 98,318

8 Claims. (Cl. 152—14)

This invention relates to anti-skid tire chains, and particularly to a device for tightening chains on the tire and taking up slack that occurs in the chain and retaining the chain tight during operation.

It is also an object of the invention to provide such a device that is simple in construction and reliable and effective in operation, and which may be easily applied to the chain.

It is a further object to provide a device for taking up the slack and tightening a chain which is not affected by centrifugal action but always maintains the chain tight regardless of the speed at which the car is driven.

With the foregoing and other objects in view I have devised a device two satisfactory forms of which are illustrated in the accompanying drawing forming a part of this specification, although it will of course be understood that other forms may be used and various modifications employed within the scope of the invention.

Figure 1:
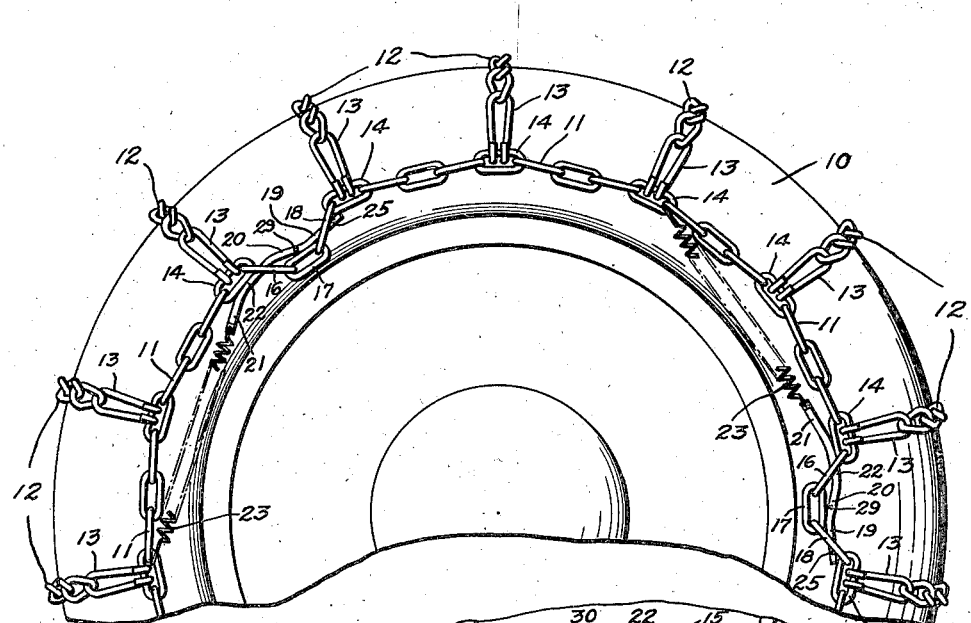
Fig. 1 is a side elevation of a portion of an automobile wheel including a tire and with an anti-skid chain applied thereto in which is shown one form of my improved tightening means, this means being shown in its operative position of tightening or shortening the effective length of the side chain.
Figure 2:
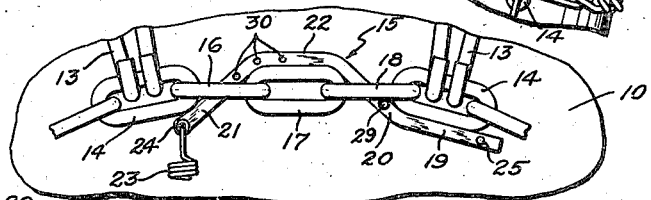
Fig. 2 is an enlarged view showing the device in the position it occupies when applied to the chain and before acting to take up the slack.

Referring first to the forms of Figs. 1 and 2, there is shown applied to the tire 10 an anti-skid chain including side chains of which one side chain 11 only is shown, and which side chains are connected at suitable intervals by cross members 12 extending transversely over the periphery of the tire in the usual manner, these cross members being usually in the form of short chains having end members 13 hooked into suitably spaced links 14 of the side chains.

It is necessary for applying these chains to the tire that they be of a length to provide a certain amount of slack or looseness in order to get them on the tire. It is very important that this slack or looseness be taken up after the chain is on the tire as otherwise at high speeds the cross chains 12 are thrown out away from the tire by centrifugal action and as the wheel rotates these chains then hit the pavement with a hard blow soon pounding the chains to pieces. Various devices have been made for tightening the side chains and taking up the slack, one common method being to employ a number of springs connected across the chain, but these have not proved to be satisfactory because the force of the spring is relied on to maintain the chain tight and resist centrifugal action, with the result that at high speeds the springs stretch and the chain loosens up.

I have provided improved means in which there is positive securing of the chain in the tightened position so that there is no possibility of the chain loosening under centrifugal action at high speeds and the slack in the chain is automatically taken up as it develops. In the form shown in Figs. 1 and 2 this device comprises a metal bar 15 which may be of substantially rectangular cross section and preferably is of a width substantially equal to or slightly less than the width of the opening in the links of the side chain so that it may be extended through certain of these links and slide freely therein. In the form of Figs. 1 and 2 this bar is bent substantially as shown so that when the cord of the side chain, such as the cord between two cross members 12 and comprising the links 16, 17 and 18, is straight as shown in Fig. 2 the straight end portion 19 of the bar lies under one of the links 14, an angular portion 20 passes outwardly through the link 18, another angular portion 21 bent in the opposite direction passes inwardly through the link 16 and the intermediate portion 22 overlies the intermediate link 17. In this position it will be seen the device has no effect on the side chain and this chain can assume its normal position of looseness and have its greatest effective length so as to possess the necessary slack required in applying the chain to the tire.

A coil spring 23 is secured to the end of the portion 21 by any suitable means such for example as a hook passing through an opening 24 in the bar, and after the chain is in position on the tire the opposite or free end of this spring is hooked into a link of the chain spaced a suitable distance from the bar. In the illustration shown this is a link 14 of the second cross member around the tire. This arrangement has been found to work very satisfactory although the particular link to which the free end of the spring is connected will depend on the length of the spring. As the free end of the spring is thus fastened the spring is stretched placing it under tension and the spring therefore acts to draw the bar 15 lengthwise through the links 16 and 18 to or toward the position shown in Fig. 1. It will be evident that in this movement camming action of the offset portion 22 and the inclined connecting portions 20 and 21 will force the intermediate link 17 inwardly thus forcing the links 16, 17 and 18 laterally out of the line of the chain, thus in effect shortening the effective length of the chain and taking up a certain amount of the looseness or slack in the chain. I have found that a bar bent substantially as shown will take up about seven-eighths of an inch in the side chain. The bar is prevented from being drawn entirely through the links by any suitable stop means such for example as lugs or pins 25 adjacent the free end of the bar so as to engage the link 18 as shown in Fig. 1 to limit the movement of the bar.

Any suitable number of these devices may be employed in a side chain but three or four have been found to be sufficient to take up the slack in the normal chain. The first one or two of these devices in which the spring 23 is connected as shown in Fig. 1 will be shifted through their maximum movement to the position shown in Fig. 1, but as the greater portion of slack is taken up the last one or two to be connected will be shifted only part of this movement or to an intermediate position, and as it continuously tends to shift them further toward the position of Fig. 1 they will immediately and automatically take up any further slack or looseness as soon as it develops in the chain. They therefore not only automatically and immediately take up any slack or looseness in the chain but they always maintain the chain tight on the tire. It will be seen from Fig. 1 that as the bar is a positive means holding the links of the cord of the side chain laterally offset or out of alignment centrifugal action will have no effect on the device and the chain will be held taut even at high speeds.

Figure 3:
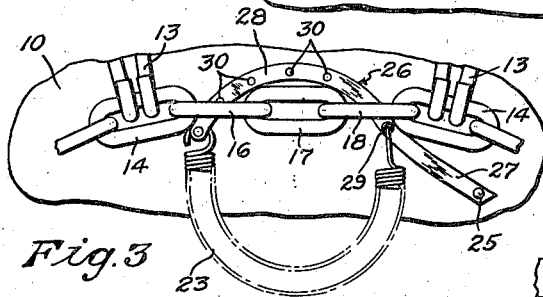
Fig. 3 is a similar view to Fig. 2 showing a somewhat modified construction.
Figure 5:
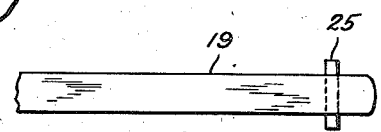
Fig. 5 is a plan view of one end portion of the tightening member.
Figure 4:
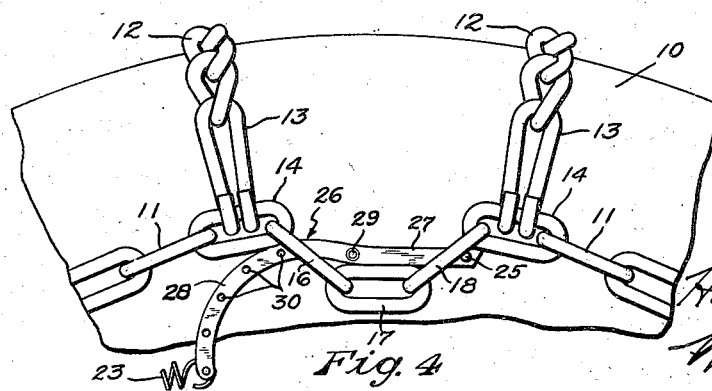
Fig. 4 shows the device of Fig. 3 in the tightening position.

In the forms shown in Figs. 3 and 4 the bar is shaped somewhat differently. In this modification the bar 26 has a substantially straight end portion 27 but it is curved at 28 so as to pass outwardly through the link 18, over the intermediate link 17 and inwardly through the link 16 while the chain is substantially straight or the links are in substantial alignment as shown, and to the free end of this curve is attached the spring 23. This device operates in the same manner as the device of Figs. 1 and 2. After the chain is applied to the tire the free end of the spring 23 is connected to a suitably spaced link as shown in Fig. 1 to thus stretch and tension the spring. The force of the spring then draws the bar 26 through the links to the position of Fig. 4 if the side chain has sufficient slack, otherwise to an intermediate position. It will be evident that in this action the curved or offset portion of the bar 26 reacting between the links 14 and the intermediate link 17 offsets this link and the connecting links 16 and 18 laterally as indicated in Fig. 4, the same as does the device of Figs. 1 and 2 to thus shorten the effective length of the side chain and to take up slack or looseness in the chain. It will be seen that in both forms there is a sort of camming action which acts when the bar is shifted to force certain links of the chain laterally out of alignment to thus shorten the effective length of the chain. This form of Figs. 3 and 4 also has a stop 25 the same as the form of Figs. 1 and 2 to prevent the bar being drawn too far through the links.

To facilitate applying the chain to the tire and to prevent the bar 15 and 26 from sliding into the shortening position and thus taking up the slack before the chain is properly applied, a stop means may be provided to retain the bar in the position of Figs. 2 and 3 while the chain is being applied. This may be any suitable means, but a simple and effective means is to provide the bar with an opening 29 just on the inner side of the link 18 and inserting a pin or other suitable means through it to prevent the bar 15 or 26 sliding through the links, or preferably the free end of the spring 23 may be hooked through this opening as shown in Fig. 3. When used this way the spring not only keeps the bar in proper position until the chain is applied to the wheel but the free end of the spring is secured so that it is not flopping around so as to get in the way or interfere with the application of the chain.

It is pointed out that it is not necessary that the spring 23 be employed with all of the tightening bars used in a side chain. Thus for example the first one or two applied may be shifted from the positions of Figs. 2 or 3 to the position of Figs. 1 and 4 by hand so as to take up a certain amount of the slack in the chain, and they may be secured in this position by some suitable means such for example as a cotter pin passed through any one of a series of openings 30 in the bar which may be inwardly of the link 16 to thus hold the bar in this position and prevent its slipping back. Also, this cotter pin could be used to hold the bar in this tightened position should a spring break while out on the road. However, other bars on the chain would be used with the spring 23 so as to take up the remainder of the slack and automatically take up any additional slack that may develop and thus always maintain the chain tight on the tire.

It will be evident that other shapes and forms of the tightening member may be used so long as it has the action of offsetting some of the links of the chain to shorten the effective length of the chain. It will be seen from the foregoing description that this device is very simple and may be easily applied, that it has a positive holding effect on the offset links which is not affected by centrifugal action and therefore that it will not permit the chain to loosen up even when operated at high speeds. Also, that any slack or looseness is automatically taken up just as quickly as it develops and the chain is always maintained tight on the tire. Furthermore, the bars 15 and 26 are wholly within the limits of the side chain so that the bar is always protected and is not injured should the wheel be run against a curb or other obstruction.

Having thus set forth the nature of my invention, what I claim is:

1. In a tire chain including side chains and cross members, means for tightening a side chain comprising a member passing through a plurality of links of said chain, said member being so shaped and sufficiently rigid to offset links laterally from the line of the chain when the chain is in position on the tire and retain these links in this position.

2. In a tire chain including side chains and cross members, means for tightening a side chain comprising a member passing through a plurality of links of said chain and shiftable therein, said member being so shaped as to pass through the links in one position with the chain substantially straight and when shifted to another position to offset links laterally from the line of the chain, and means for retaining the member in the latter position.

3. In combination a chain comprising a plurality of connected links, and means for shortening the effective length of the chain comprising a bar passing through a plurality of links and shiftable therein, said bar being so shaped that in one position it passes through the links with the chain substantially straight and when in another position it offsets links laterally from the line of the chain, and means for retaining the bar in the latter position.

4. In a tire chain including side chains and cross members, means for tightening a side chain comprising a bar passing through a plurality of links and shiftable therein, said bar having cam means operable on shifting of the bar to offset links from the line of the chain, and means for retaining the bar in the latter position.

5. In a tire chain including side chains and cross members, means for tightening a side chain comprising a bar extending through a plurality of links and shiftable therein, said bar being shaped to pass through the links with the chain substantially straight and when shifted to another position to offset links from the line of the chain, and means tending to shift the bar to the latter position to take up slack in the chain as it develops.

6. In a tire chain including side chains and cross members, means for tightening a side chain comprising a bar extending through a plurality of links and shiftable therein, said bar having an offset portion to permit the chain links to lie substantially in alignment when the bar is in one position, and said offset portion forming means to force links out of alignment when the bar is shifted to another position.

7. In a tire chain including side chains and cross members, means for tightening a side chain comprising a bar extending through a plurality of links and shiftable therein, said bar having an offset portion to permit the chain links to lie substantially in alignment when the bar is in one position, said offset portion forming means to force links out of alignment when the bar is shifted, and resilient means tending to shift the bar to the latter position and retain it therein.

8. In a tire chain including side chains and cross members, means for tightening a side chain comprising a member passing through a plurality of links of said chain and shiftable therein, said member being so shaped as to pass through the links in one position with the links substantially in alignment and when in another position to offset links laterally from the line of the chain, and resilient means tending to shift the member to the latter position and retain it therein.

HARRY D. WEED.